Sept. 15, 1970　　　　W. F. FIEBER　　　　3,528,311
HYDROSTATIC TRANSMISSION CONTROL
Filed Nov. 21, 1968　　　　　　　　　　　　4 Sheets-Sheet 1
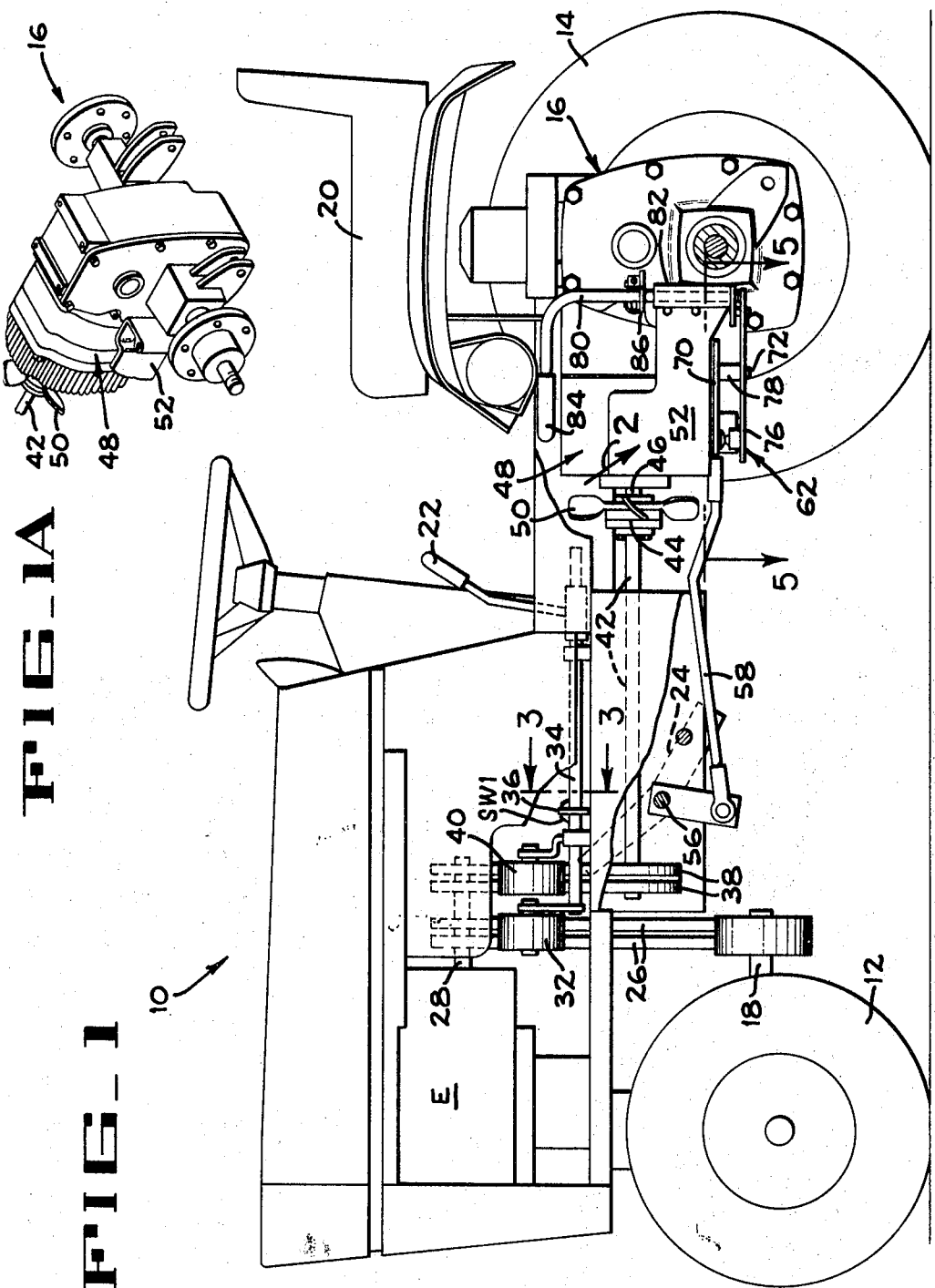
INVENTOR.
WALTER F. FIEBER
BY F. W. Anderson
C. E. Tripp
ATTORNEYS

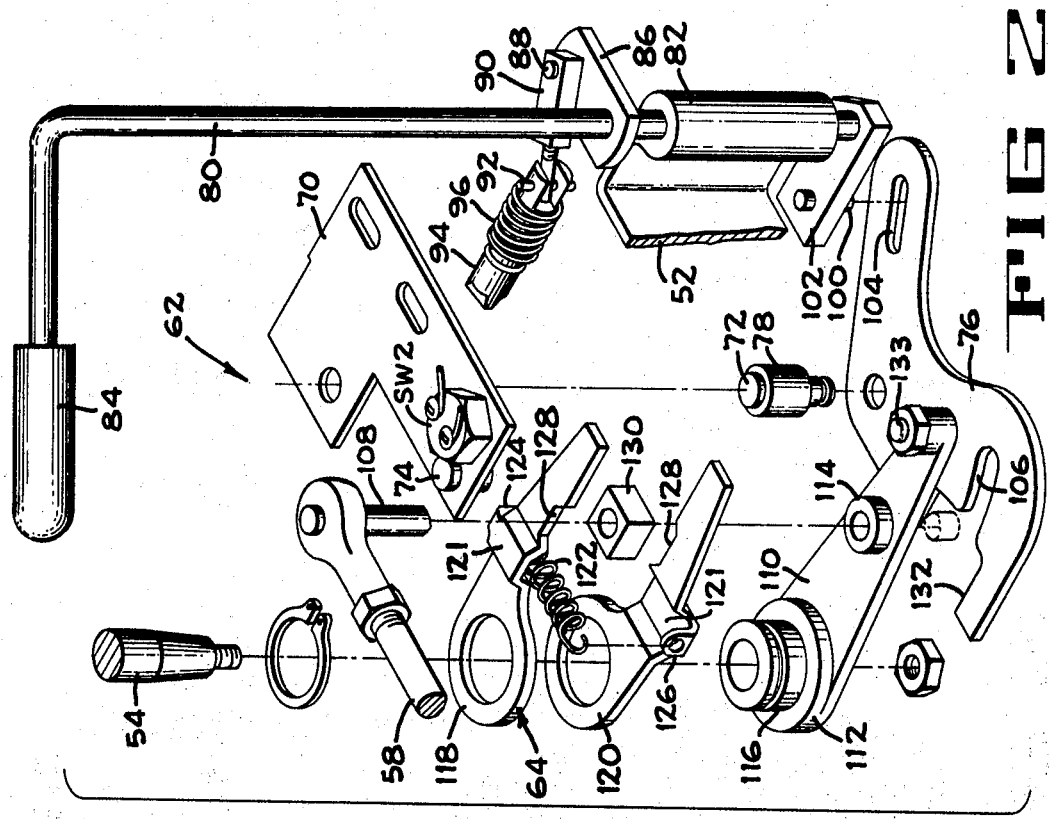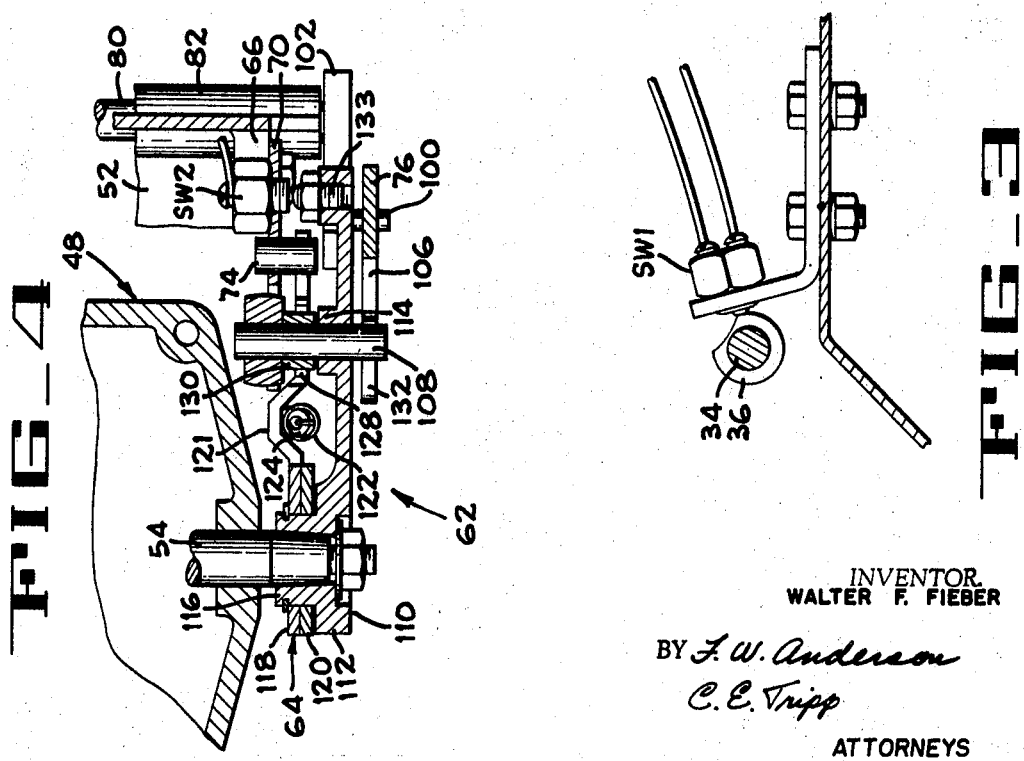

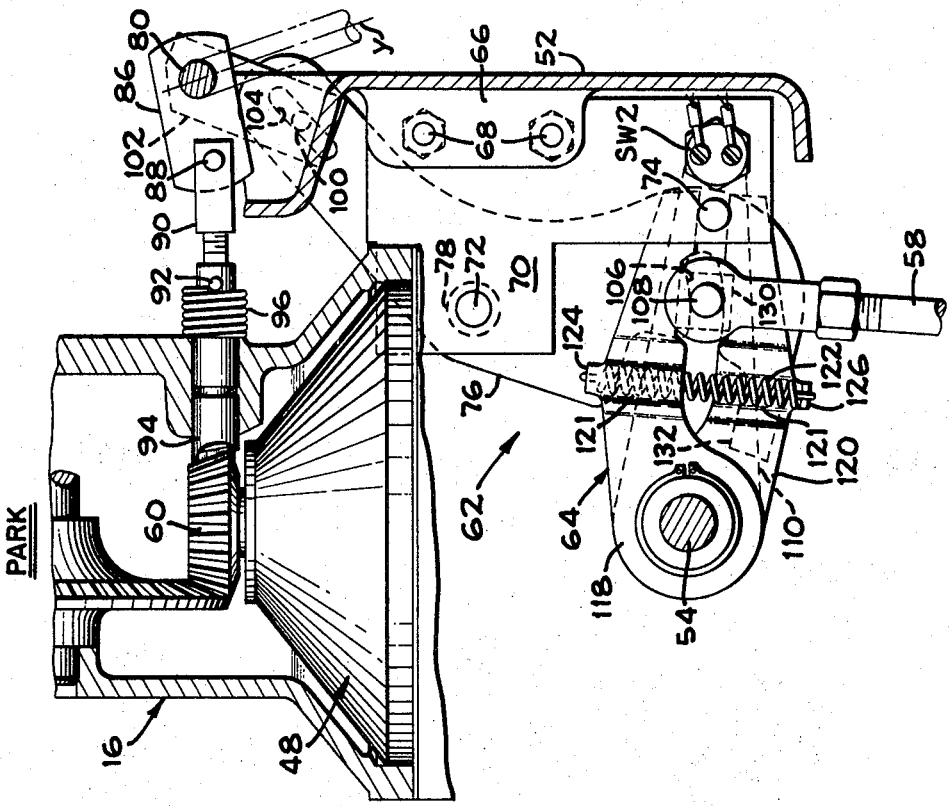

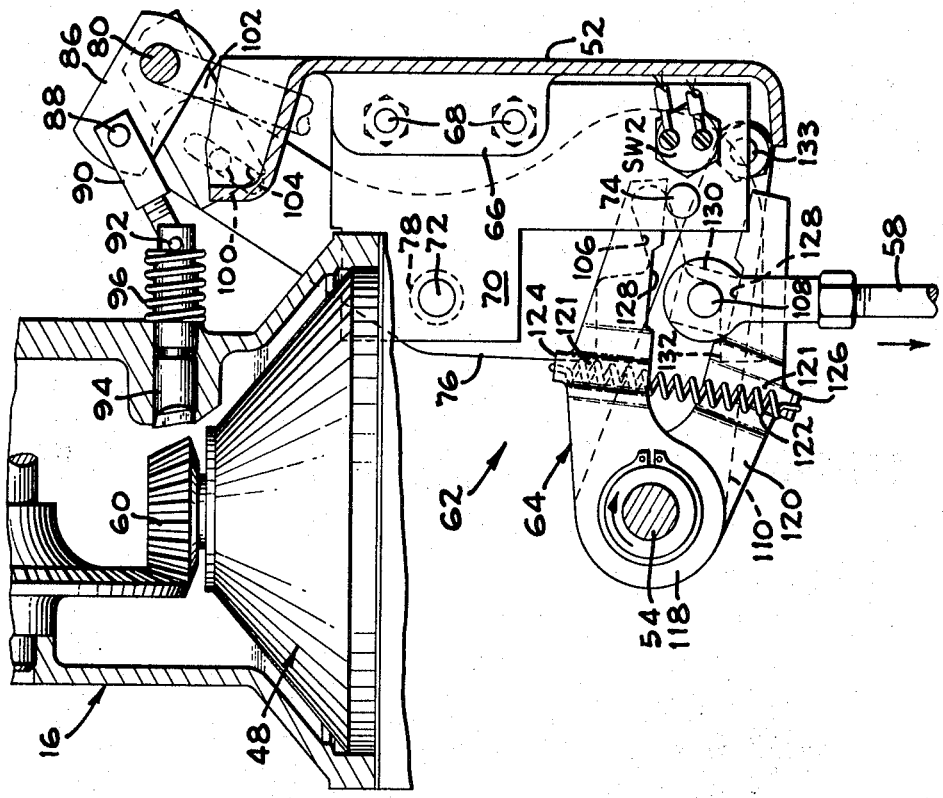
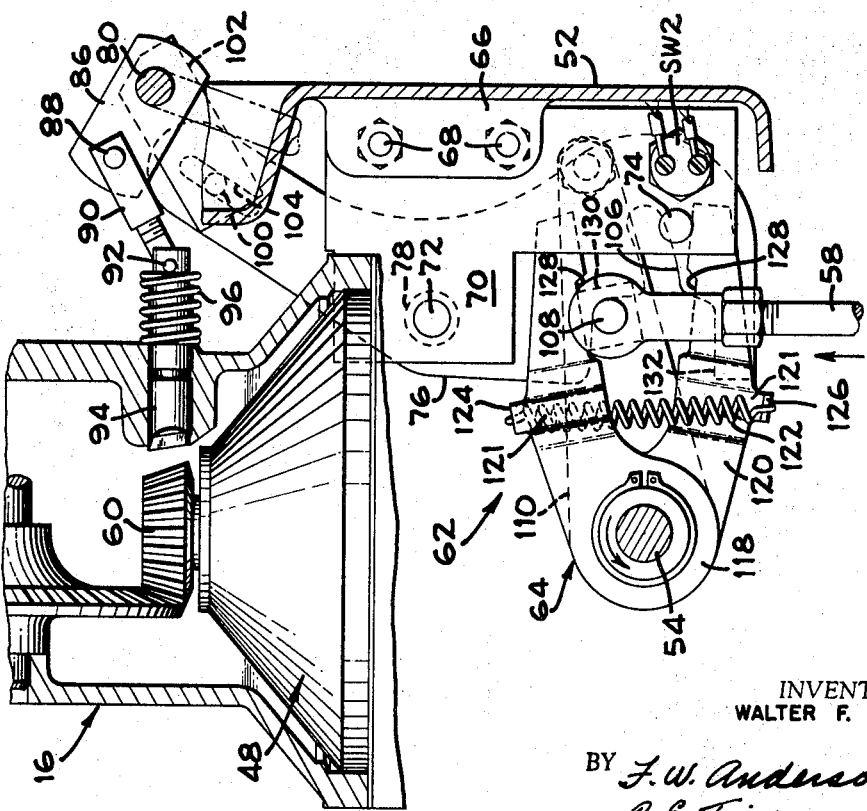

United States Patent Office 3,528,311
Patented Sept. 15, 1970

3,528,311
HYDROSTATIC TRANSMISSION CONTROL
Walter F. Fieber, Saukville, Wis., assignor to FMC Corporation, San Jose, Calif., a corporation of Delaware
Filed Nov. 21, 1968, Ser. No. 777,587
Int. Cl. G05g 11/00
U.S. Cl. 74—481                                         9 Claims

ABSTRACT OF THE DISCLOSURE

A tractor with a hydrostatic transmission is controlled for speed and directing by a rocking pedal. A parking lever locks the transmission and its associated drive train in neutral. Electrical interlocks complete an ignition circuit only when the transmission is in neutral and the power take off is idle. The pedal actuates the control shaft of the transmission, which by means of a centering mechanism is maintained in neutral position in the absence of pedal actuation. The pedal is locked when the parking lever locks the transmission.

BACKGROUND OF THE INVENTION

The field of the present invention concerns control linkages for a small tractor type of vehicle having a hydrostatic transmission.

Prior art disclosures of generally similar control linkages are found in U.S. Pats. 3,250,340 and 3,313,174, and include rocking foot pedal controls which when the upper portion of the pedal is depressed actuate the transmission to provide forward movement, and when the lower portion of the pedal is depressed provide rearward movement. Intermediate these positions the pedal and the transmission are in a neutral position and/or a park position.

In order to provide for safe operation, it is desirable to provide mechanisms which assure that in the absence of operator control the transmission will automatically return to neutral, which prevent inadvertent actuation of the transmission when the vehicle is parked, which assure against transmission actuation in dual modes of operation such as directional movement when the drive train is locked, and which preclude engine starting when the transmission is in other than a neutral position. These problems, common to the prior art structures cited above, are those to which the present invention is directed.

SUMMARY OF THE INVENTION

An important aspect of the present invention is the provision of a centering mechanism associated with a transmission control shaft of a hydrostatic transmission which provides output power when the control shaft is rotated in either direction from a zero or neutral position. More specifically, the centering mechanism includes a pair of gripper jaws freely journalled on the control shaft and having confronting end portions gripping a stop pin. A spring biases the jaws together, and their intermediate portions grip flat portions of a rotatable centering collar which is carried by an actuating lever for the control shaft. The collar is movable in the plane of the jaws by a rocking pedal. The jaws thus return the actuating lever to neutral position when the pedal is released, and permit rotation of the control shaft in either direction. Interrelated with the centering mechanism are various interlocking electrical and mechanical controls.

BRIEF DESCRIPTION OF THE DRAWINGS

FIG. 1 is a side elevation, partly in section, of a tractor embodying the transmission control mechanism operating in accord with the principles of the present invention.

FIG. 1A is a perspective of a hydraulically driven transaxle unit used in the tractor illustrated in FIG. 1.

FIG. 2 is an exploded isometric of the transmission control linkage in the area indicated by the arrow 2 on FIG. 1.

FIG. 3 is an enlarged fragmentary section taken along lines 3—3 on FIG. 1.

FIG. 4 is a vertical section taken along lines 4—4 on FIG. 5.

FIGS. 5–8 are fragmentary horizontal sections taken along lines 5—5 on FIG. 1, and respectively illustrate the transmission control linkage positioned for NEUTRAL, PARK, FORWARD and REVERSE modes of operation.

DESCRIPTION OF THE PREFERRED EMBODIMENT

FIG. 1 illustrates a small garden tractor 10 supported by steerable front wheels 12 and driven rear wheels 14, the nearest of which is omitted to reveal a transaxle unit 16 (FIG. 1A). Power for the transaxle unit, and for accessory drives such as a power take off (PTO) shaft 18, is provided by an engine E under the control of an operator positioned on a seat 20 and having access to various conventional control devices, such as a PTO lever 22, a rocking foot-pedal 24, and throttle and hydraulic lift controls, not shown.

A pair of V-belts 26 are trained around pulleys on the engine output shaft 28, and on the PTO shaft 18. The V-belts are tightenend by a belt tensioning roller 32 which is fixed in offset relation to a shaft 34. Sidewise movement of the PTO lever 22 rotates the shaft 34 so that the V-belts are tightened by the roller 32 to drive the PTO shaft for powering accessories such as a mower, snow caster or the like.

With the PTO lever 22 in drive position, a cam 36 (FIG. 3) on the shaft 34 actuates the plunger of an electrical switch SW1 and opens its contacts. In conjunction with another switch later mentioned, the switch SW1 is arranged to electrically isolate the starter for the engine E so that the engine cannot be started while any accessory is being driven by the PTO mechanism.

A second pair of V-belts 38 are driven by pulleys on the engine shaft 28 and are kept tensioned by a roller 40 to drive a central longitudinal driveshaft 42. Driveshaft 42 is connected by a flexible coupling 44 to the power input shaft 46 of a hydrostatic transmission at 48 which is part of the transaxle unit 16. A shrouded fan 50 is secured to the driveshaft 42 to direct cooling air rearwardly over the housing of the transmission.

Control linkage for the transmission is mounted upon a cast bracket 52 and actuates a control shaft 54 (FIGS. 2 and 4) which depends from the housing of the transmission 48. A commercially available item, the transmission (FIG. 1A) is manufactured by the Eaton Marshall Division of Eaton, Yale and Towne, located in Marshall, Mich. The transmission 48 includes a variable displacement pump and a fixed displacement motor. Control shaft 54 varies the displacement of the pump and the direction in which the hydraulic fluid is pumped. With the engine E operating at a fixed throttle setting, the control shaft 54 provides infinitely variable speed changes from full speed forward to full speed reverse. This allows complete matching of power to the load with positive control, and also provides dynamic braking.

The rocking foot pedal 24 is arranged to rotate a support shaft 56, which in turn actuates a push-pull rod 58 that moves fore and aft, from the intermediate zero or neutral position illustrated in FIG. 1, and moves the control shaft 54 to a selected rotative position to provide the selected speed and directional control. Thus, when the control shaft 54 is rotated away from a neutral setting in which a pinion gear 60 (FIGS. 5-8) on the output side of the transmission is idle, the control shaft governs the output of the variable displacement pump whereby the speed of rotation of the pinion gear is proportionate to the amount one end of the pedal 24 is depressed, and the direction of rotation of the pinion gear 60 depends upon which end of the pedal is depressed.

Because only a slight rotation of the transmission control shaft 54 will rotate the pinion gear 60, it is extremely important that the transmission control linkage be arranged to always precisely position the control shaft 54 to its neutral setting when the pedal 24 is released. This, and other functions are effected by a control linkage assembly 62 which includes a centering mechanism 64.

With reference to FIGS. 2, 4 and 5, the bracket 52 is provided with an inturned horizontal flange 66. Bolts 68 are threaded into the flange 66 and secure a mounting plate 70 which carries a pivot pin 72 and a stop pin 74. A locking hook 76 is pivoted upon the pin 72 and spaced below the mounting plate 70 by a spacer 78. The locking hook 76 provides a latch mechanism which holds the control linkage 62 for the transmission 48 in NEUTRAL when a parking lever 80 is positioned to lock the drive train in PARK position.

The parking lever 80 extends through an upright bearing portion 82 of the bracket 52 and has an upper end handle portion 84 accessible to the operator. When the handle is aligned with a reference line x (FIG. 5) the parking lever is inactive. When aligned with a reference line y (FIG. 6) the parking lever is set, and the drive train of the tractor is locked. Thus, the lower end of the lever 80 carries a lever arm 86 which is held by a pivot pin 88 to a toggle link 90. A pin 92 secures link 90 to a pawl 94 which projects from the housing of the transmission 48. A compression spring 96 biases the pawl outward.

When the parking lever 80 is moved between its FIG. 5 and FIG. 6 positions, the inner end of the pawl 94 meshes with and locks the pinion gear 60. At the same time, the pin 88 moves over center, toggle fashion, to lock the parking lever in its set position until it is positively returned to an inactive position by the operator.

At the same time the parking lever is set, the locking hook 76 pivots about its pivot pin 72 from its FIG. 5 unlocked position, to its FIG. 6 locked position. In the former case, the transmission 48 can be actuated by the foot pedal 24 either in FORWARD or REVERSE, but when the locking hook 76 is positioned as shown in FIG. 6, the transmission controls are locked in NEUTRAL and the pinion gear 60 is locked.

With continued reference to FIGS. 2, 4 and 5, the locking hook 76 is actuated by a stud 100 which depends from a lever arm 102 on the lower end of the parking lever 80. The stud 100 travels in an elongate slot 104 of the locking hook to swing the hook when the PARK lever is actuated. In FIG. 5 the locking hook is in a release or off position in which it has no control function, whereas in FIG. 6 the locking hook is in a set or on position in which it indirectly prevents rotation of the transmission control shaft 54 in either direction.

For this purpose, an arcuate, open end slot 106 of the locking hook 76 is arranged to receive the lower end portion of an index shaft 108, which moves with the push-pull rod 58, whenever the parking lever 80 is set as in FIG. 6. When the parking lever is not set, the locking hook slot 106 is clear of the index shaft 108. The transmission control shaft 54 is then in a condition for actuation (rotation) by fore or aft movement of the push-pull rod 58.

In the absence of any movement of the rocking pedal 24, the transmission control shaft 54 is returned to its FIG. 4 NEUTRAL position by the centering mechanism 64. As best shown in FIG. 2, the centering mechanism includes a crank 110 which has an internally tapered hub 112 locked onto the tapered lower end portion of the control shaft 54. Intermediate its ends, the crank 110 is provided with an apertured spacer hub 114, through which the index shaft 108 projects and crosses the plane of movement of the locking hook 76 as shown in FIG. 4.

The hub of the crank 110 has a reduced diameter portion 116 which rotatably mounts two gripper or centering jaws 118 and 120. Each jaw is formed with an offset portion at 121 to clear a tension spring 122 that is anchored between tab portions 124 and 126. The portions of the jaws outward of the spring 122 lie in a common plane. Firmly gripped between flats 128 of the gripper jaws by the action of the spring 122 is a square centering collar 130. The index shaft 108 extends through the centering collar, which is freely rotatable on the index shaft. The confronting outer edges of the gripper jaws engage the stop pin 74 which depends from the mounting plate 70.

As clearly shown in FIG. 2, the mounting plate 70 is slotted for the bolts 68 (FIG. 5). This provides that the stop pin 74 can be precisely positioned, angularly relative to the control shaft 54, so that when the jaws 118 and 120 grip the stop pin, the transmission control shaft 54 is in the precise NEUTRAL position necessary to prevent transfer of power through the transmission. With the described construction, the rocking foot pedal 24 may be actuated in either direction because the centering jaw which lies in the direction of movement can be resiliently displaced by the centering collar 130. It should be observed that the centering collar 130 merely increases the bearing surfaces between the index shaft 108 and the gripper jaws to forestall normal wear, and that the centering action can be obtained by having the gripper jaws 118 and 120 directly grip the index shaft 108.

In FIG. 7 the upper centering jaw has pivoted toward the pinion gear 60, thus indicating that the upper portion of the rocking pedal 24 has been depressed for forward travel. It will be evident, however, that the parking lever 80 must first have been placed in its FIG. 5 position to release the latching hook 76 from the index shaft 108 before the crank 110 will rotate to shift the transmission to the illustrated FORWARD position. FIG. 8 shows a similar actuation of the transmission, except that the pedal 24 has been actuated in a reverse direction and the gripper jaw 120 is displaced. This shifts the transmission 48 into REVERSE, and in both FORWARD and REVERSE the speed of the pinion gear 60 is in proportion to the extent the control shaft 54 is rotated. It will be seen that the wall portions of a large notch 132 of the locking hook 76 limit the fore and aft movement of the index shaft 108.

The previously mentioned electrical switch SW1 (FIG. 3) is in series connection with a switch SW2 (FIGS. 2-8). The latter switch has normally open contacts arranged to be closed by an upstanding bolt 133 on the free end of the crank 110. As shown in FIGS. 5 and 6, this condition is satisfied only when the transmission 48 is in NEUTRAL, with the parking lever 80 either set or inactive. Another important aspect of the transmission control linkage 62 is that if the pedal 24 is released, the spring 122 of the centering jaws causes the one jaw engaged with the centering collar 130 to return the crank 110 to its NEUTRAL position, and that this neutral position is always the same due to the coaction of the gripping jaws 118 and 120 with the stop pin 74.

It will be noted that the parking lever 80 can only be actuated to set the pawl 94 to lock the drive train when the slot 106 of the locking hook 76 is aligned with the shaft 108. When so aligned, the switch SW2 is actuated by the bolt 133. Provided that switch SW1 is closed, (indicating no drive connection to the PTO shaft 18) the engine E can be started. This assures that the transmission is in either NEUTRAL, or PARK for engine starting.

The gripping jaws 118, 120 and the stop pin 74 provide a dependable mechanism for returning the transmission control shaft 54 to NEUTRAL after each actuation of the crank 110 in either direction. It should also be noted that the disclosed structural arrangement of the centering mechanism is especially proof against lost motion resulting from normal wear because the effects of wear are self cancelling due to the symmetry of the parts. Other important aspects of the invention are that the parking pawl is prevented from engaging with the pinion gear wheesn the pinion is rotating, and that the transmission is maintained in NEUTRAL when the parking pawl is engaged because the locking hook 76 prevents pawl actuation with the transmission in a drive mode, and prevents selection of a drive mode until the pawl is released by means of the parking lever 80.

Having thus described the invention, that which is believed to be new, and for which protection by Letters Patent is desired, is:

Having completed a detailed description of the invention so that those skilled in the art could practice the same, I claim:

1. In a control mechanism for the hydrostatic transmission of a tractor wherein the output torque, direction and speed is governed by rotatively positioning an exterior control shaft of the transmission, an actuating lever for rotating said control shaft to a selected angular position in each direction to a forward or reverse position from a neutral position, an index shaft projecting from said lever, a pair of gripping jaws having a common fixed pivot axis and confronting gripping surfaces straddling said index shaft, a fixed stop pin engaged by the confronting free end surfaces of said gripping jaws, a spring biasing said jaws toward said index shaft and said stop pin, and means for swinging said actuating lever to position the control shaft in either forward or reverse from said neutral position, one of said gripping jaws thus being displaced in the direction of movement of said index shaft while the other gripping jaw is immobilized by said stop pin, the displaced gripping jaw being returned to its initial position by said spring upon release of said actuating lever.

2. In a control mechanism for the hydrostatic transmission of a tractor wherein the output torque, direction and speed is governed by rotatively positioning and exterior control shaft, an actuating lever for rotating said control shaft to a selected position in each direction to a forward or reverse position from a neutral position, an index shaft projecting from said lever, a centering collar rotatable on said index shaft, a pair of gripping jaws freely rotatable on said control shaft and having confronting surfaces engaged with said centering collar, a fixed stop pin engaged by the free confronting end surfaces of said gripping jaws, a tension spring biasing said jaws toward said centering collar, and means for swinging said actuating lever to position the control shaft in either forward or reverse from said neutral position.

3. Control mechanism according to claim 2 and a locking hook, and a pivot mounting said locking hook for swinging movement between locking and unlocking positions in a plane including said index shaft, said locking hook defining an arcuate locking slot arranged to restrain movement of said index shaft in said locking position so that said actuating lever is locked in the neutral position, and to accommodate movement of said index shaft in said unlocking position so that said actuating lever is movable in either a forward or a reverse direction from said neutral position.

4. Control mechanism according to claim 3 wherein said transmission includes an output gear and a movable locking pawl for selectively locking the output gear of the transmission, a parking lever for actuating said pawl, toggle linkage interconnecting said parking lever and said locking pawl, and a lever coupling said parking lever to said locking hook, actuation of said parking lever to move said locking hook to said locking position conjointly moving said locking pawl into locking relation with said output gear and moving said toggle linkage into an over center position preventing accidental release of said locking pawl and movement of said locking hook to said unlocking position.

5. Control mechanism according to claim 3 and a normally open electrical switch mounted in fixed position adjacent said actuating lever, said switch having an actuator only engaged by said actuating lever in neutral position to close the contacts thereof, the control mechanism thus being adapted to close an ignition circuit through the switch contacts for starting the engine of the tractor when the control shaft is in a neutral position.

6. In a control mechanism for a hydrostatic tractor transmission in which direction and speed is controlled by rotatively positioning an exterior control shaft, means for centering said control shaft in a neutral position intermediate a forward and a reverse position, said centering means including an actuating lever on said control shaft, an index shaft carried by said lever, a fixed stop pin adjacent said index shaft, said index shaft and said stop pin being parallel to the axis of said control shaft and in a radial plane of said axis when said control shaft is in said neutral position, and a pair of pivotally interconnected gripping jaws biased to a closed position, said gripping jaws cooperatively defining parallel gripping surfaces straddling said index shaft and said stop pin.

7. In combination with a hydrostatic transmission in which direction and speed is controlled by rotatively positioning a control shaft of the transmission, centering means for returning the control shaft to a neutral intermediate position comprising an index shaft operatively carried by said control shaft for movement in a path spaced from said control shaft, a fixed stop pin parallel to and adjacent said index shaft, a pair of gripping jaws pivotally interconnected on a common axis which is parallel to the axes of said index shaft and said stop pin, and a spring resiliently biasing said gripping jaws into gripping contact with said index shaft and said stop pin, each of said gripping jaws being independently displaceable by said index shaft so that said spring tends to restore both the displaced jaw and the index shaft to their initial positions.

8. In combination with a hydrostatic tractor transmission which is actuated by rotatively positioning a control shaft of the transmission away from a neutral position, centering means for returning said control shaft to the neutral position comprising an index shaft operatively carried by the transmission control shaft for movement in a path spaced from said control shaft, a stop pin mounted in a fixed position adjacent said index shaft, and a pair of gripping jaws resiliently biased to a closed position and pivoted together on a fixed axis adjacent said index shaft and said stop pin, said gripping jaws having gripping surfaces in straddling engagement with said index shaft and said stop pin when said index shaft is in a neutral position, movement of said index shaft thus displacing one or the other of said gripping jaws against the resilient bias tending to restore the displaced jaw and the index shaft to their initial netural positions.

9. In combination with a hydrostatic tractor transmission which is actuated by rotatively moving a control shaft of the transmission away from a neutral position, centering means for automatically returning said control shaft to the neutral position in the absence of rotative movement of said control shaft comprising a centering member operatively connected to said control shaft for movement therewith, means for limiting movement of said centering member to arrest the shaft in the neutral rotative position, resilient means connected to said centering member for biasing said control shaft toward said position, and a controllable index member arranged to engage and move said centering member to rotate said control shaft away from said position, said resilient means returning said control shaft to said position in the absence of control of said index member.

References Cited

UNITED STATES PATENTS

| 3,208,299 | 9/1965 | Leonard et al. | 74—491 |
| 3,382,733 | 5/1968 | Miller et al. | 74—491 X |
| 3,431,792 | 3/1969 | Smith | 74—481 |

MILTON KAUFMAN, Primary Examiner

U.S. Cl. X.R.

74—474, 478